United States Patent [19]
Diehle et al.

[11] Patent Number: 6,102,492
[45] Date of Patent: Aug. 15, 2000

[54] METHOD AND DEVICE FOR CONTROLLING BRAKING FORCE DISTRIBUTION IN A MOTOR VEHICLE

[75] Inventors: Stefan Diehle, Korntal-Münchingen; Alfred Strehle, Fellbach, both of Germany

[73] Assignee: Robert Bosch GmbH, Stuttgart, Germany

[21] Appl. No.: 09/155,701

[22] PCT Filed: Nov. 7, 1997

[86] PCT No.: PCT/DE97/02594

§ 371 Date: Oct. 5, 1998

§ 102(e) Date: Oct. 5, 1998

[87] PCT Pub. No.: WO98/35864

PCT Pub. Date: Aug. 20, 1998

[30] Foreign Application Priority Data

Feb. 14, 1997 [DE] Germany ................ 197 05 619

[51] Int. Cl.[7] ................ B60T 8/96; B60T 8/32; B60T 8/26; B60T 8/60
[52] U.S. Cl. ................ 303/113.5; 188/349; 303/122; 303/122.12; 303/186; 303/176; 303/DIG. 4; 303/9.62; 303/122.05
[58] Field of Search ................ 303/113.5, 186, 303/187, 188, 176, 122.04, 122.05, 122.01, 122, DIG. 3, DIG. 4, 9.62, 122.12; 188/349, 181 R, 181 A; 701/76, 75, 92, 82, 71, 79, 74, 70

[56] References Cited

U.S. PATENT DOCUMENTS

| 5,281,012 | 1/1994 | Binder et al. . | |
| 5,558,415 | 9/1996 | Buschmann et al. | 303/113.5 |
| 5,641,209 | 6/1997 | Kushi et al. | 303/186 |
| 5,795,039 | 8/1998 | Fennel et al. | 303/122.05 |
| 5,887,957 | 3/1999 | Büttner et al. | 303/113.5 |
| 5,935,186 | 8/1999 | Yamazaki et al. | 303/113.5 |
| 5,938,299 | 8/1999 | Hara et al. | 303/113.5 |
| 5,975,650 | 11/1999 | Meier et al. | 303/186 |
| 6,009,366 | 12/1999 | Burkhard et al. | 303/186 |

FOREIGN PATENT DOCUMENTS

| 41 12 388 | 10/1992 | Germany . |
| 44 01 995 | 4/1995 | Germany . |
| 44 14 980 | 11/1995 | Germany . |
| 1 95 11 152 | 10/1996 | Germany . |
| 1 95 11 161 | 10/1996 | Germany . |
| 1 95 11 162 | 10/1996 | Germany . |

OTHER PUBLICATIONS

"Electronic Control Unit of the Sumitomo Electronic Antilock System," H. Kumamoto et al., SAE Technical Paper Series, International Congress and Exposition, Detroit, Michigan, Feb. 27–Mar. 3, 1989, paper #890870.

Primary Examiner—Douglas C. Butler
Attorney, Agent, or Firm—Kenyon & Kenyon

[57] ABSTRACT

The invention relates to a method and device for controlling braking force distribution in a motor vehicle. In the case of failure of the braking system, the braking force distribution regulator enters emergency mode. The regulation is activated when the speed and the deceleration of the vehicle exceed given minimum values. The invention also concerns emergency measures for regulating the braking force distribution in the case of the certain individual errors.

15 Claims, 2 Drawing Sheets

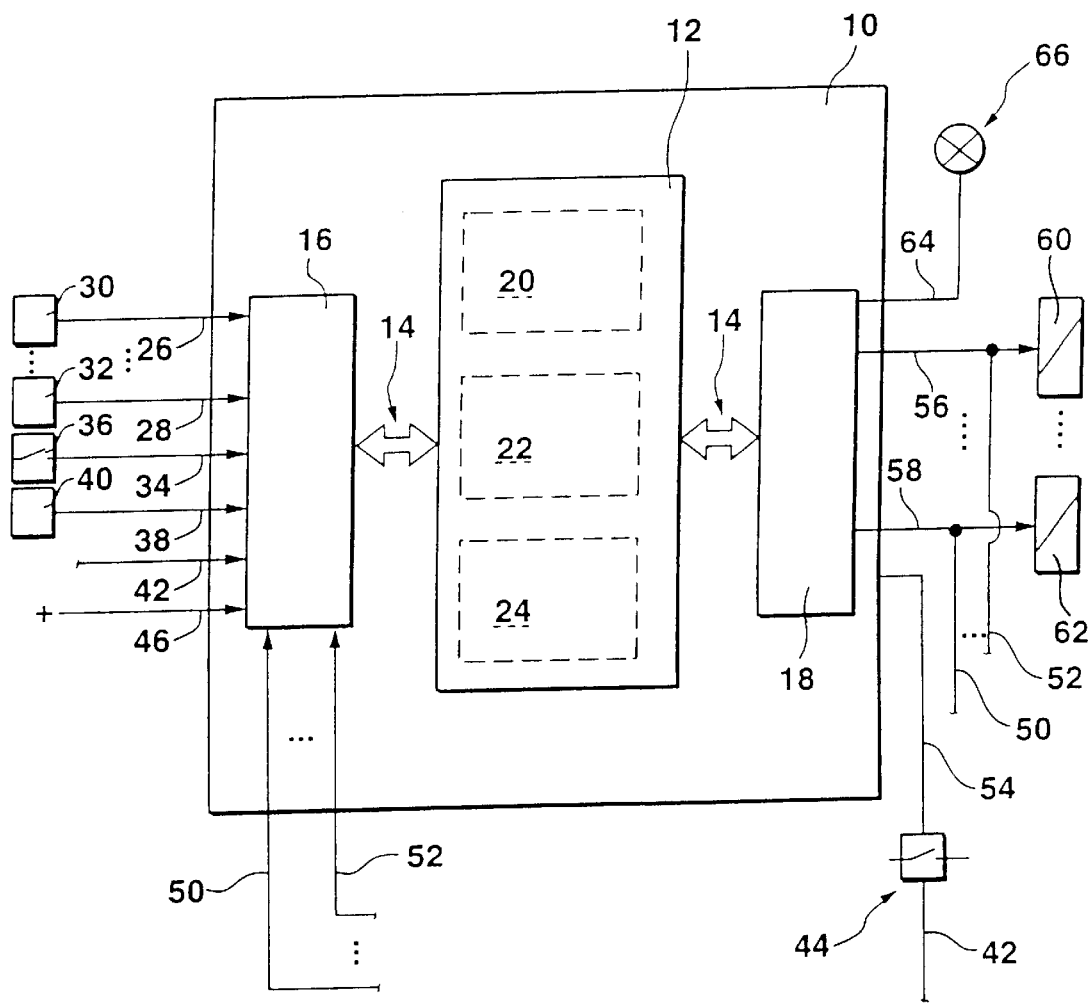
F I G. 1

METHOD AND DEVICE FOR CONTROLLING BRAKING FORCE DISTRIBUTION IN A MOTOR VEHICLE

FIELD OF THE INVENTION

The present invention relates to a method and an apparatus for controlling braking force distribution in a motor vehicle.

BACKGROUND INFORMATION

German Patent No. 41 12 388 (U.S. Pat. No. 5,281,012) discloses a method and an apparatus for regulating or controlling braking force distribution in a motor vehicle on the basis of the wheel speeds of the front and rear wheels. If this electronic control system fails for any reason, undesirable driving situations can result in certain braking circumstances due to overbraking of the rear axle.

An emergency mode has therefore been proposed, for example in German Patent No. 1 95 11 152, for the case in which two speed sensors have failed simultaneously. In this, a saturation pressure value which is below the inlet pressure defined by the driver is established at the rear-wheel brakes by alternating pressure buildup and pressure reduction.

Further features for controlling or regulating the braking force distribution between the front and rear axles of a motor vehicle in the event of faults are described in German Patent No. 1 95 11 161 and German Patent No. 1 95 11 162.

In German Patent No. 1 95 11 161, the braking force distribution control system is deactivated in the event of faults within the control unit, and otherwise continues to operate, at least to a restricted extent, in the event of individual faults. For example, in the event of a defect in a speed sensor on a rear wheel or a front wheel, control is continued on the basis of a replacement signal. Control also continues in the event of defects in an actuator which lead to an undiminished brake pressure buildup at a front wheel, faults in the area of the return flow pump, faults in an actuator which lead to an inability to reduce braking force, or in the event of undervoltage. In the event of defects in an actuator which lead to an absence of pressure buildup at a front wheel, defects in an actuator which lead to an undiminished brake pressure buildup at a rear wheel, the controller is switched to passive mode.

German Patent No. 1 95 11 162 depicts emergency features of a braking force distribution control system in the event of faulty rotation speed signals. In this, in the event of a fault in a front-wheel rotation speed signal of the control system, the functional front-wheel rotation speed signal is taken as the basis, or the fastest of all the remaining wheels is utilized; in the event of a fault in a rear-wheel rotation speed sensor, the vehicle speed reference signal is used as the substitute signal. In addition, the sensitivity of the braking force distribution controller is increased in the event of a fault.

Methods for fault detection are described, for example, in SAE Paper 890870, "Electronic Control Unit of the Sumitomo Electronic Antilock System."

The conventional procedures for maintaining the braking force distribution regulation or control system in the event of a fault manage the individual faults described therein reliably and effectively. Detailed emergency features of the braking force distribution controller are not described, in particular in the event of a fault in the brake pedal switch whose position is analyzed as an indicator of a braking action and thus for activation of the controller.

SUMMARY OF THE INVENTION

An object of the present invention is to optimize a regulation of the braking force distribution system between the front and rear axles in a motor vehicle in the event of a fault.

The procedure according to the present invention optimizes the emergency mode of a braking force distribution control system in a motor vehicle.

It is particularly advantageous that faults in a brake pedal switch can also be dealt with, and that braking force distribution control can be continued even in such a case.

It is moreover particularly advantageous that using a series of pressure buildup pulses, in the absence of a controller action, excessively rapid injection of braking pressure into the rear-wheel brakes, as well as the risk of an overbraked rear axle associated therewith, is avoided.

It is furthermore particularly advantageous that even in the event of an undervoltage which does not cause the system to deactivate, a fault in the return flow pump, and/or a fault in an outlet valve on the rear axle, a braking force distribution control action is performed by corresponding actuation of the inlet valve. It is advantageous in this context that here again, a pressure rise gradient limiting system is provided in order to prevent excessively rapid injection of pressure into the rear-wheel brakes.

It is moreover particularly advantageous that in the event of a failure of a rotation speed sensor, the rotation speed signal of the same side of the vehicle is used as the substitute signal, while in the event of a fault in two rotation speed sensors, the pressure limitation known from the existing art is applied. It is particularly advantageous in this context that when the vehicle is stationary, the limitation is discontinued, and a further pressure buildup, to no more than the driver's inlet pressure, is permitted so that the vehicle's stationary status can be safely maintained.

BRIEF DESCRIPTION OF THE DRAWINGS

FIG. 1 shows a block diagram of a braking system.

DETAILED DESCRIPTION

Figure 2:
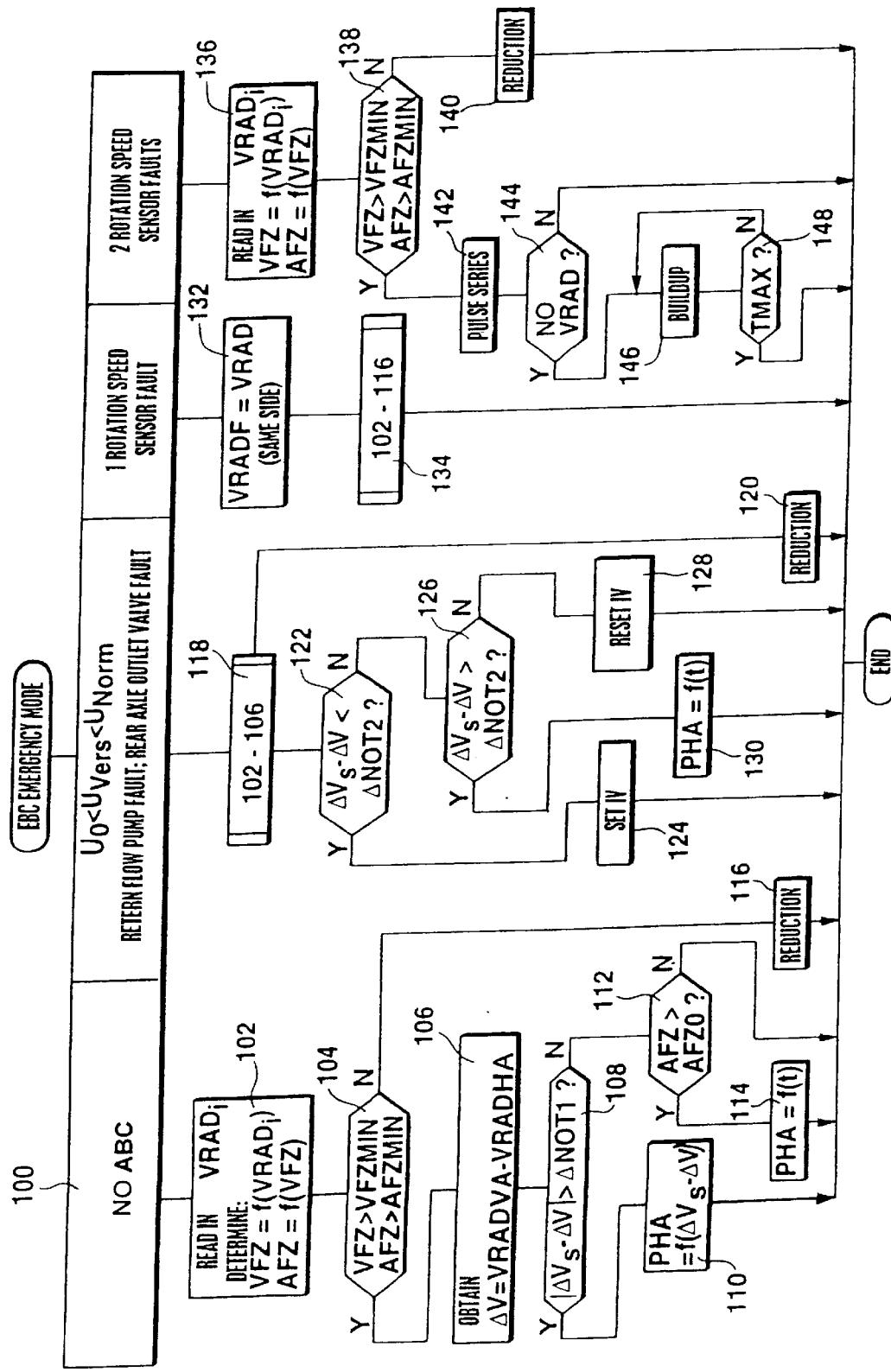
FIG. 2 shows a flow chart outlining an implementation of the braking force distribution control system in selected fault instances.

FIG. 1 shows a block diagram of a braking system in which the procedure according to the present invention is used. A control unit 10 includes at least one microcomputer 12. The microcomputer 12 is linked via a bus system 14 to an input module 16 and an output module 18 for data interchange. In a preferred exemplary embodiment, microcomputer 12 contains an ABS controller 20, a braking force distribution controller 22, and a fault identification unit 24. The fundamental manner of operation of these controllers and of the fault identification unit is known from the existing art described above.

Input lines 26 through 28 from wheel-speed sensors (rotation speed sensors) 30 through 32, an input line 34 from a brake pedal switch 36, an input line 38 from a return flow pump 40 of the braking system, and a line 42 from valve relay 44, are conveyed to input module 16. Suitable potentials of the corresponding components, or fault data, are conveyed via lines 38 through 42 for monitoring. An input line 46 connects input module 16 to a supply voltage 48. Also conveyed to it are lines 50 through 52, which provide the signal variables necessary for monitoring of the inlet and outlet valves. These lines also include corresponding signal variables of valves for implementing an automatic slip control system and/or a vehicle dynamics control system (intake valve, switchover valve). From output module 18 of control unit 10, a first output line 54 leads to valve relay 44, output lines 56 through 58 lead to actuators 60 through 62 of the individual wheel brakes, and at least one further output line 64 leads to at least one warning light 66.

In the normal operating mode of the braking system, if at least one of the wheels begins to lock, the ABS controller releases the brake by defined activation of the associated actuators. In the case of hydraulic or pneumatic braking systems, "actuators" are understood to be, for example, inlet and outlet valves. In the preferred exemplary embodiment, incipient locking is detected on the basis of the discrepancy between the rotation speed of the relevant wheel and a reference speed constituted from at least one wheel rotation speed. Before this so-called ABS situation occurs, the braking force distribution controller guarantees that the rear wheel brakes do not overbrake, i.e. that the wheels of the rear axle do not lock before the wheels of the front axle. This is accomplished, in the preferred exemplary embodiment, in accordance with the existing art described above. According to this, the rear-wheel braking pressure is established, by the activation of actuators, in such a way that the slowest rear wheel runs more slowly, by a predefined differential magnitude, than the fastest front wheel. This prevents the rear wheels from getting into an operating range in which begin to lock. What is therefore performed is a limitation of the rear-wheel braking force which leads, at least in certain braking systems and even in the partial braking range, to a deviation from the braking force distribution between front and rear axles defined by the braking system.

The fault identification unit checks the operation of the microcomputer and of the further components of control unit 10, and identifies the functionality of the external components, in particular rotation speed sensors 30 through 32, valve relay 44, return flow pump 40, and actuators 60 through 62, as well as the supply voltage level. If a fault situation is detected, microcomputer 12 then, at least in certain fault circumstances, activates warning lamp 66 to inform the driver. In addition, the ABS controller and/or the braking force distribution controller are deactivated or partially deactivated, or continue to function.

When double faults exist (except when double faults are present in the area of the rotation speed sensors), the braking force distribution controller (EBC) is always deactivated. In the event of individual faults, an emergency reaction specific to the fault is implemented. Exceptions are defects in two rotation speed sensors, in the brake light switch, in the event of undervoltage, in the event of the valve relay sticking, and when an emergency wheel is mounted. In these cases the EBC operates in emergency mode.

EBC emergency mode is initiated if at least one of the individual faults described below is present, or if the ABS controller is not available. In the latter case, utilization of the control system as an emergency measure for the braking force distribution controller no longer depends on the position of the brake pedal switch, but rather depends on whether the vehicle speed and vehicle deceleration exceed a predefined limit value. The control action known from the existing art takes place during the braking action, a pressure rise gradient limiting function for the rear-wheel braking pressure being initiated at greater decelerations and if the control system is not engaged. For this, the rear-wheel braking pressure is increased after a predefined ramp-up time, for example by emitting pulses of predetermined length which result in a brake pressure profile at the rear wheels which rises in ramped fashion over time. This prevents excessively rapid injection of braking pressure, and overbraking of the rear wheels.

The braking force distribution controller continues to operate in the context of an emergency mode in the event of undervoltage in a range above a lower limit value, if faults occur in one or two rotation speed sensors, if one of the valve relay contacts sticks, if faults occur in the or one of the return flow pump(s), in the event of a short-circuit to supply voltage of an inlet or outlet valve of a front wheel or if a valve stall occurs, and if faults occur in an outlet valve of a rear wheel.

An immediate deactivation of the braking force distribution controller takes place in the event of overvoltage if the supply voltage exceeds a predefined threshold value, in the event of undervoltage if the supply voltage falls below the lower limit value, if internal faults occur in the control unit, if an interruption of the valve relay occurs, in the event of a short-circuit to ground at an inlet or outlet valve of a front wheel, and if faults occur in an inlet valve of a rear wheel. The intake and switchover valves are treated like the other valves (deactivated in the event of short-circuit to ground, emergency mode in the event of stall and short-circuit to battery voltage).

The flow diagram shown in FIG. 2 describes in more detail the actions performed in the emergency mode of the controller.

The program depicted in FIG. 2 for the emergency mode of a braking force distribution controller (EBC) is initiated whenever normal mode is not present, and no faults are present which cause deactivation of the braking force distribution controller. In the first step 100, a designated emergency action is selected on the basis of the fault situation that is detected. If the ABS controller (ABS) is not available, in step 102 the wheel speeds Vradi of the wheels of the motor vehicle are read in, and the vehicle speed is identified using these wheel speeds. In a preferred exemplary embodiment, vehicle speed VFZ is constituted, at least in emergency mode, from the second-fastest wheel speed. From vehicle speed VFZ that is identified, vehicle deceleration AFZ is then calculated, preferably by differentiation over time. Suitable filter measures are used to limit the slope of the two calculated signals. In the subsequent step 104, a check is made on the basis of signals VFZ and AFZ as to whether a braking action is present. This is the case if the vehicle deceleration is greater than a minimum speed VFZmin, and the vehicle deceleration is greater than a minimum deceleration AFZmin. If this is not the case, then in step 116 the actuators at the rear wheels are activated so as to allow a pressure reduction in accordance with the driver's stipulation. If a braking action was detected in step 104, in step 106 the discrepancy $\Delta V$ between the fastest front wheel VRADVA and the slowest rear wheel VRADHA is obtained. This discrepancy is compared, in the following step 108, with a setpoint $\Delta VS$. If discrepancy $\Delta V$ lies above or below the setpoint by a predetermined magnitude $\Delta NOT1$, then in step 110 the pressure at the rear-wheel brakes is established, by actuation of the inlet and/or outlet valves, in accordance with the difference between the setpoint and actual value, in such a way that the difference between the setpoint and actual value lies within the predefined tolerance rang $\Delta NOT1$. Provision is made in this context for tolerance range $\Delta NOT1$ to be of smaller magnitude as compared with fault-free operation of the braking force controller, so that the overall control system is more sensitive in configuration. If the difference between the setpoint and actual value is within the tolerance range, braking pressure is then built up at the rear-wheel brakes as defined by the driver stipulation. If, however, in step 112, vehicle deceleration AFZ exceeds a predefined limit value AFZ0 which lies above the minimum limit value AFZmin, then in step 114 the pressure at the rear-wheel brakes is brought up in accordance with a predefined time function. In the preferred exemplary embodiment, this is carried out using a pulse series having predefined pulse lengths and interpulse periods. This results in a slower pressure rise at the rear wheels due to limitation of the pressure rise, so that in the event of large decelerations and thus strong brake pedal actuations by the driver, the pressure increase at the rear axle does not occur too quickly, and the rear axle is not overbraked. This pulse series is terminated by cycling through the program depicted in FIG. 2, in which either step 108 institutes the control system or, in step 112, the vehicle deceleration falls below the limit value (preferably plus a hysteresis magnitude).

If step 100 identifies a supply voltage which lies between normal voltage and a lower limit value (undervoltage), or a fault in the return flow pump or a fault in an outlet valve of a rear-wheel brake, in step 118 the previously mentioned steps 102 through 106, to determine the vehicle speed, vehicle deceleration, a braking action, and actual value ΔV, are first performed. If step 104 has indicated that no braking action is present, in step 120 the actuators of the rear wheels are set so that a pressure reduction is initiated. During a braking action in the event one of the faults outlined above is present, in step 122 the difference between setpoint and actual value is obtained, and if a tolerance value ΔNOT2 is exceeded, then in step 124 the inlet valves of the rear wheels are closed (set IV). If the difference between setpoint and actual value is greater than tolerance value ΔNOT2 (step 126), then the rear wheels are slower than the front wheels, so that in step 128 the inlet value can be opened to reduce the pressure (reset IV). If the difference is within tolerance range ΔNOT2, then in step 130, similarly to step 114, the rear-wheel braking pressure is built up in the context of a pulse series. The outlet valves and return flow pump are not actuated if one of the aforementioned faults is present.

If step 100 detects that a rotation speed sensor is faulty, then in step 132 the faulty wheel signal VradF is replaced by wheel-speed signal Vrad of the same side. Steps 102 through 116 are then performed correspondingly as defined by step 134.

If a fault in two rotation speeds is detected in step 100, then in step 136, similarly to step 102, the vehicle speed is obtained on the basis of the second-fastest wheel speed and the vehicle deceleration AFZ on the basis of vehicle speed VFZ. In the subsequent step 138, similarly to step 104, the braking action is detected based on a comparison of vehicle speed VFZ and vehicle deceleration AFZ with minimum values. If no braking action exists, then in step 140 the valves are adjusted so that a braking pressure decrease is enabled. If a braking action is present, then in step 142 a pressure limitation is performed at the rear axle, as is known from the existing art described above. If the vehicle comes to a halt in this instance, no further wheel-speed signals are present. If this is detected in step 144, then in step 146 a buildup pulse series for a rear axle, with a limited pulse length, is begun. As a result, pressure is built up at the rear axle above the limitation, in order to keep the vehicle stationary. In the subsequent step 148, in an advantageous exemplary embodiment the time that has elapsed since the beginning of the pressure buildup pulse series is compared to a maximum value Tmax. If the maximum value is not reached, then in step 146 further pressure is built up; otherwise the program element is terminated.

The maximum time is one alternative. In another exemplary embodiment it is dispensed with, and the pulse series is continued until the driver's inlet pressure is reached. Alternatively, pressure is held at the rear axle brake until release of the brake pedal has been detected on the basis of the brake pedal switch.

The approach described is advantageously used in hydraulic or pneumatic braking systems. The approach outlined, with the advantages described, is moreover also used in braking systems with electrical brake application. In this context, instead of the braking pressure, the variable that is regulated in such braking systems (braking force or braking torque) is to be used. In addition, for application in pneumatic or electromechanical braking systems, the references to hydraulic components are to be omitted or correspondingly modified.

In the context of the description of the approach according to the present invention, "braking force" is to be understood as braking pressure, braking torque, etc.

What is claimed is:

1. A method for controlling a braking force distribution in a motor vehicle, the motor vehicle including front wheels, rear wheels, front axles and rear axles, comprising the steps of:

regulating the braking force distribution between the front and rear axles as a function of a first speed of the front wheels and a second speed of the rear wheels using a braking force distribution controller; and if at least one fault is detected,
providing emergency measures for the braking force distribution controller, and
activating the braking force distribution controller as a function of a vehicle speed of the motor vehicle and a deceleration of the motor vehicle.

2. The method according to claim 1, further comprising the step of:

if the deceleration is greater than a first predetermined value, increasing a first braking pressure of the rear wheels as a function of a predetermined braking force rise function corresponding to the emergency measures.

3. The method according to claim 2, wherein the predetermined braking force rise function is provided externally from a control system.

4. The method according to claim 1, further comprising the step of:

if an anti-lock breaking system controller is unavailable, initiating the emergency measures.

5. The method according to claim 4, further comprising the steps of:

if the emergency measures are initiated,
determining a difference value as a function of a third speed of a fastest front wheel of the front wheels and a fourth speed of a slowest rear wheel of the rear wheels,
determining an actual value as a function of the difference value, and
comparing the actual value with a second predetermined value to determine a resulting value; and if the resulting value is greater then a predefined tolerance range of the emergency measures, applying a control action to a braking force of the rear wheels to adjust the actual value into the predefined tolerance range.

6. The method according to claim 1, further comprising the step of:

if the at least one fault is detected, initiating the emergency measures.

7. The method according to claim 1, further comprising the step of:
if an undervoltage is detected, implementing a braking force distribution control by actuating corresponding inlet valves of the rear wheels.

8. The method according to claim 1, further comprising the step of:
if the at least one fault is detected in a return flow pump, implementing a braking force distribution control by actuating corresponding inlet valves of the rear wheels.

9. The method according to claim 1, further comprising the step of:
if the at least one fault is detected in one of outlet valves of the rear wheels, implementing a braking force distribution control by actuating corresponding inlet valves of the rear wheels.

10. The method according to claim 1, further comprising the step of:
if the at least one fault is detected in a rotation speed sensor, replacing a rotation speed signal of the rotation speed sensor with a further rotation speed signal of a further wheel of the motor vehicle, the further wheel situated on a same side as a wheel with the rotation speed sensor.

11. The method according to claim 1, further comprising the step of:
determining the vehicle speed as a function of a rotation speed signal of a second-fastest wheel of the motor vehicle.

12. The method according to claim 1, further comprising the step of:
if the at least one fault is detected in first and second rotation speed sensors, limiting a braking force on brakes of the rear wheels.

13. The method according to claim 1, further comprising the step of:
if the at least one fault is detected in first and second rotation speed sensors, maintaining a braking force when the motor vehicle is a stationary position.

14. The method according to claim 1, further comprising the step of:
if the at least one fault is detected in first and second rotation speed sensors, increasing a braking force.

15. An apparatus for controlling a braking force distribution in a motor vehicle, the motor vehicle including front wheels, rear wheels, front axles and rear axles, comprising:
a braking force distribution controller distributing a braking force between the front and rear axles as a function of rotation speed signals of the front and rear wheels;
a fault detection arrangement detecting at least one fault in a braking system and initiating emergency measures for the braking force distribution controller,
wherein, if the at least one fault is detected, a vehicle speed of the motor vehicle is greater than a first predetermined value and a vehicle deceleration of the motor vehicle is greater than a second predetermined value, the braking force distribution controller is activated.

* * * * *